Aug. 17, 1937.                    J. C. CLINTON                    2,090,470
                              ELECTRICAL RECEPTACLE
                              Filed July 12, 1933              2 Sheets-Sheet 1
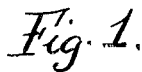
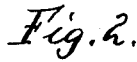
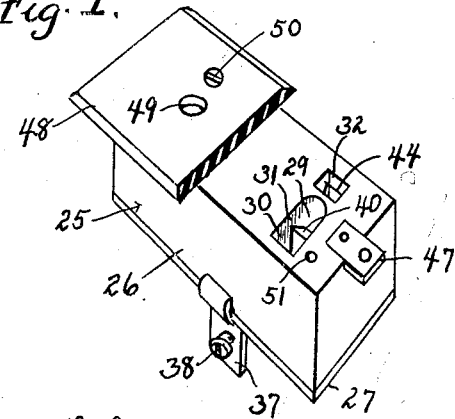
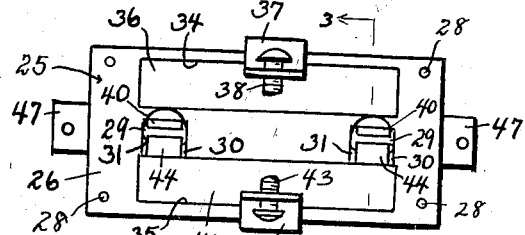
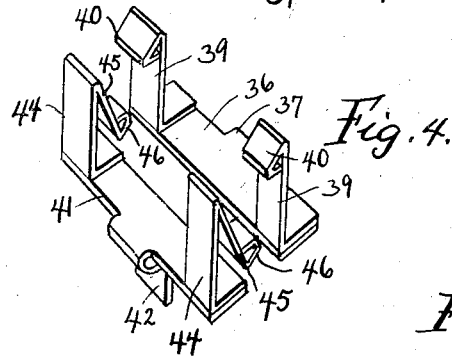
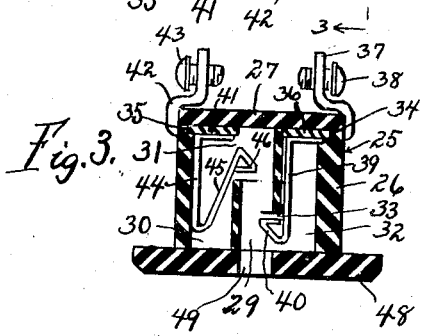
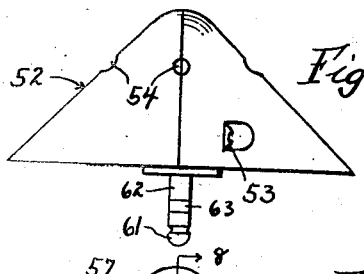
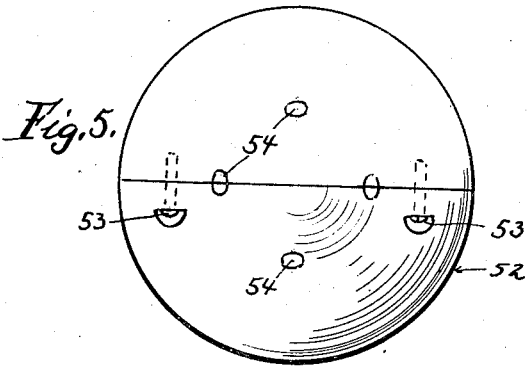
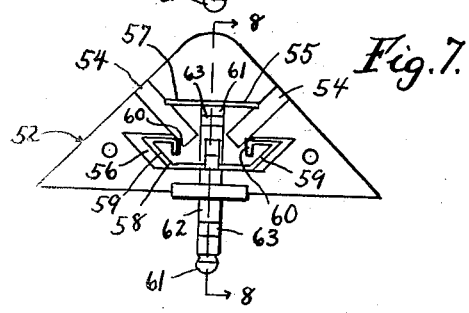
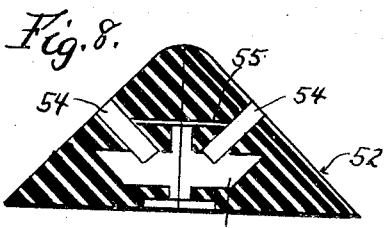
INVENTOR
James C. Clinton
By W. W. Williamson
Atty.

Aug. 17, 1937. J. C. CLINTON 2,090,470
ELECTRICAL RECEPTACLE
Filed July 12, 1933  2 Sheets-Sheet 2
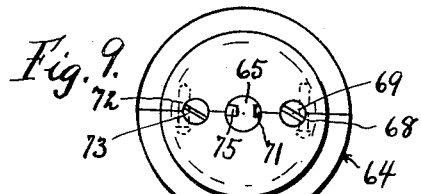
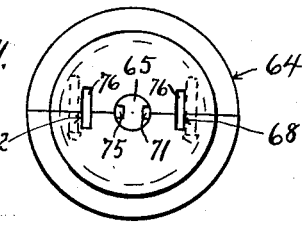
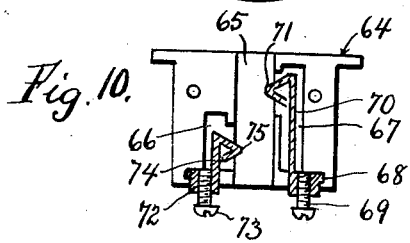
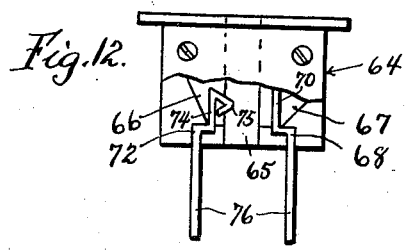
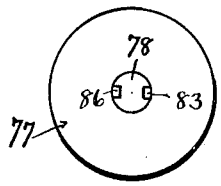
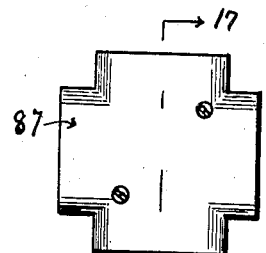
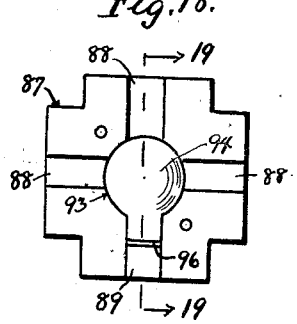
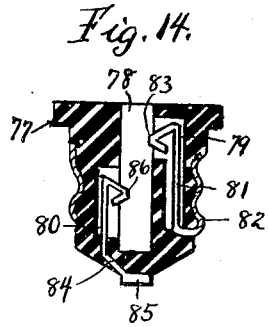
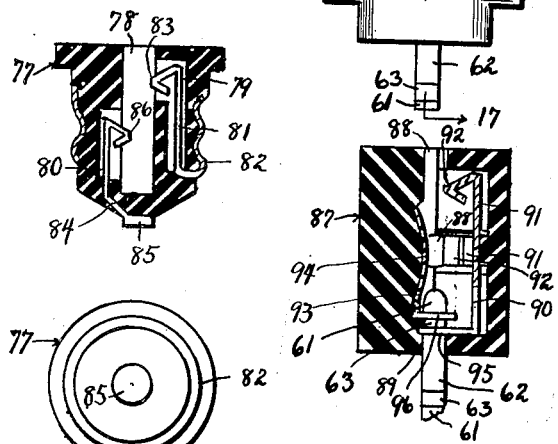
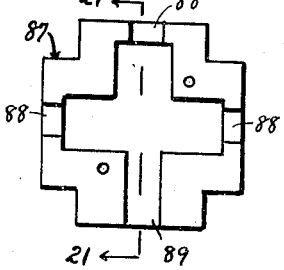
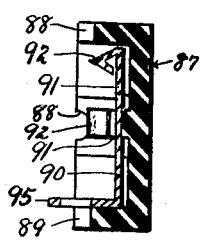
INVENTOR
James C. Clinton
By W. W. Williamson
Atty.

Patented Aug. 17, 1937

2,090,470

UNITED STATES PATENT OFFICE 2,090,470

ELECTRICAL RECEPTACLE

James C. Clinton, Chillicothe, Ohio

Application July 12, 1933, Serial No. 680,052

2 Claims. (Cl. 173—330)

My invention relates to new and useful improvements in an electrical receptacle, the same being a continuation in part of my copending application, Serial Number 572,238, dated October 31, 1931, which has since matured into Patent No. 1,996,459, issued April 2, 1935, and has for one of its objects to generally improve the construction of such devices to provide a compact, simple article of this class which will be inexpensive in the cost of manufacture although strong and durable.

Another object of the invention is to provide an electrical receptacle having straight line contacts.

Another object of the invention is to provide an electrical receptacle in which the contact elements are in a straight line and located in a single straight opening for the reception of a straight line plug.

Another object of the invention is to provide an electrical receptacle using the principles of my invention as above outlined for the reception of one or more plugs.

A further object of the invention is to provide a receptacle of the kind described in combination with a plug for use in connection with another receptacle constructed along the same lines.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a perspective view of an electrical receptacle embodying my invention showing the cover, this plate or escutcheon partly broken away.

Fig. 2 is a bottom plan view thereof when considered with relation to Fig. 1, with both the bottom wall and face plate removed.

Fig. 3 is a section on the line 3—3 of Fig. 2, with the receptacle in an inverted position.

Fig. 4 is a perspective view of the contact elements per se, illustrating their relative positions when in the casing.

Fig. 5 is an outer end view of a modified form of multiple receptacle with combined plug.

Fig. 6 is a side elevation thereof.

Fig. 7 is an inner face view of one of the halves of the casing with the contacts therein.

Fig. 8 is a section of the casing only on the line 8—8 of Fig. 7.

Fig. 9 is an inner end view of one form of single receptacle.

Fig. 10 is a face view of one half of the casing of said receptacle with the contacts in section.

Fig. 11 is an inner end view of a modified form of single receptacle showing knife blade contacts for use in connection with another receptacle or socket.

Fig. 12 is a side elevation thereof with a portion of one of the halves in the casing broken away.

Fig. 13 is an outer end view of a further modification of the single receptacle such as is used in connection with a threaded socket.

Fig. 14 is a longitudinal sectional view thereof.

Fig. 15 is an inner end view of the same.

Fig. 16 is an elevation of a combined multiple receptacle and plug.

Fig. 17 is a section on the line 17—17 of Fig. 16, with parts of the contacts in elevation.

Fig. 18 is an inner face view of one of the halves of the receptacle casing showing one of the contacts therein.

Fig. 19 is a section on the line 19—19 of Fig. 18.

Fig. 20 is an inner face view of the other half of the casing per se.

Fig. 21 is a section on the line 21—21 of Fig. 20, with the multiple contact in place.

In carrying out my invention as herein embodied, particular reference first being had to Figs. 1 to 4 inclusive, wherein 25 represents a suitable casing, preferably although not essentially comprising a body 26 and a bottom plate or closure 27, the latter being secured to the former in any suitable manner as by fastening devices which pass through the plate 27 and into holes 28 in the body.

The body is constructed of suitable insulating material and has one or more holes 29 extending all the way through from top to bottom, preferably on the longitudinal center line, each hole designed to receive an electrical contact plug having two contact points or terminals in a straight line as shown and described in my copending application, and also as illustrated in Figs. 6, 7, 16 and 17 of this application.

Running through the body parallel with the hole 29 in spaced parallel relation thereto is an opening 30, one end of which communicates with one end of the hole 29 through the passageway 31. Another opening 32 also projects all the way through the body in spaced parallel relation to the hole 29 and in a position directly opposite the opening 30, and said opening 32 communicates with the other end of the hole 29 through the passageway 33.

In the inner or bottom face of the casing are formed a pair of parallel recesses 34 and 35 of sufficient length to be common to all of the holes that may be formed in the body of the casing and which have been described as passing completely through the body from top to bottom.

A metallic strap 36 which is a conductor of electricity is fitted into the recess 34 and has a lug 37 projecting from one edge into which is threaded a screw 38 for binding a wire to the lug. The lug 37 should project from the outer edge of the strap 36 which is the edge nearest a side wall of the casing body and should extend away from the bottom of the casing as shown in Fig. 3. Projecting from the inner edge of the strap and in a direction opposite to the lug 37 is one or more spring contact arms 39, each of which has its free end so formed as to provide a nose 40, and as plainly shown in Fig. 3 the major part of the arm lies in the recess 32, while the nose projects through the passageway 33 into the hole 29.

Another strap 41 is seated in the recess 35 and has a lug 42 projected from its outer edge with a screw 43 threaded therein for binding a lead wire to the lug. From the inner edge of the strap projects one or more spring contact arms 44, each of which is bent back upon itself to form an arm extension 45 on the free end of which is formed the nose 46, which projects through the passage 31 into the hole 29, whereby the noses of a pair of contiguous contact arms are in a straight line and can both be engaged by a plug inserted in the hole 29.

The body of the casing may carry ears 47 through the medium of which the receptacle may be fastened to any supporting object, such as the wall of a building in the same manner as an outlet box. The bottom wall 27 will cover one end of the hole 29 and the openings 30 and 32 and will also cover and hold the straps 36 and 41 with their contacts in place while the upper or front of the casing body may be covered by a face plate 48 having one or more holes 49 therethrough for registration with the holes 29, and said plate is detachably fastened to the casing body by any suitable fastening means, such as screws 50, one of which is shown in Fig. 1 and which will thread into holes 51 in the casing body, one of said holes also being shown in Fig. 1.

In Figs. 5 to 8 inclusive, I have illustrated another form of electrical receptacle, particularly of the multiple type wherein the casing 52 is cone-shaped or practically so. Said casing is made in two halves connected together in any suitable manner as by fastening devices 53, and when in assembled condition has a number of holes 54 extending radially and inclined relative to the base of the receptacle. Also formed in the body are recesses 55 and 56 which communicate with different parts of all of the holes 54 for the reception of the contacts described below.

In the recess 55 is an outer contact 57 having portions projecting into all of the holes 54 and connected with one side of an electrical circuit. In the recess 56 is located an inner contact member 58 for connection with the side of a source of electricity and said contact member is provided with a plurality of arms 59 equal in number to the holes 54 and each of said arms is fashioned to provide a nose 60 for projection into a hole 54. This arrangement again places two contacts in a straight line in each of a number of holes in the receptacle whereby a plurality of connections may be made with an electrical circuit.

Suitable conductors may be connected with the contact elements but for convenience of illustration, I have shown said conductors embodying a straight double plug, such as shown in Fig. 7 of my copending application. The double plug includes two end contact portions 61 electrically connected to each other and an inner contact portion 62 of sufficient length to provide two points of contact, the several contacts being insulated from each other by insulating material 63.

In Figs. 9 and 10, I have shown what I call a single receptacle including a casing 64, preferably produced from two parts suitably fastened together, said parts being so recessed that when assembled they provide a straight hole 65 running longitudinally of the casing as well as a pair of parallel openings 66 and 67 located on opposite sides of the hole 65 and communicating with said hole at different points intermediate its length. In one opening, as 67, is mounted a contact member 68 carrying a binding screw 69 and provided with an arm 70, the free end of which is so fashioned as to provide a nose 71 projecting into the hole 65 near its outer end. In the other opening 66 is mounted an inner contact member 72 carrying a binding screw 73 and provided with a short arm 74, the free end of which is fashioned to provide a nose projecting into the hole 65 near its inner end and in spaced relation to the nose of the other contact.

The modification illustrated in Figs. 11 and 12, is similar to the form shown in Figs. 9 and 10, the essential difference being that the contact members are fashioned to include secondary knife blade contact portions 76 whereby the receptacle may be connected with another slotted receptacle or other suitable electrical appliance.

In Figs. 13 to 15 inclusive, I have illustrated a screw-in receptacle in which the casing 77, like the others previously described, is of insulating material, and said casing is provided with a hole 78 running longitudinally thereof for the insertion of a contact plug and said casing also has openings 79 and 80 parallel to and on opposite sides of the hole 78 which openings communicate with the hole at spaced apart locations longitudinally thereof. In the opening 79 is mounted an outer contact member including an arm having its inner end connected with the metal shell 82 and having its outer end fashioned to provide a nose 83 which projects into the hole 78 near its outer end. An inner contact 84 including an arm is positioned in the opening 80 and the inner end of said arm is connected with the metal disc 85, while the free end of said arm is fashioned to provide a nose 86 which projects into the hole 78 in spaced relation to the nose of the other contact longitudinally of the hole.

A further modified form of multiple electrical receptacle is shown in Figs. 16 to 21 inclusive, wherein the casing is represented by the numeral 87, said casing having a plurality of holes 88 for the reception of insertable plugs, such as previously referred to and also with a hole 89 through which suitable conductors pass to the contacts and these conductors may be in the form of a double plug, such as referred to in connection with Figs. 6 and 7.

Within suitable recesses in the casing is mounted the outer contact member 90 including a plurality of spring arms 91 each of which is parallel to a hole 88 and each spring arm has its outer end fashioned to provide a nose 92 which projects into a hole 88 adjacent its outer end.

Also mounted in the casing is an inner contact member 93 having a concavo-convex portion 94 located centrally relative to the noses on the arms of the outer contact member so that areas of the concavo-convex portion project into all of the holes 88 whereby some part of said concavo-convex portion will be in the path of travel of plugs inserted in any or all of said holes 88.

The parts of the contact members in the receptacle which are engaged by the contact elements of the plug or plugs must be so positioned that the outer end of a plug when inserted in the receptacle will terminate short of the center of the concavo-convex portion of the inner contact member in order to insure the completion of a circuit without the possibility of one plug pushing another out of place or producing a short circuit.

The contact members may be provided with any suitable means for connection with a source of electrical energy and for this purpose the outer contact member 90 is provided with an apertured lug 95 and the inner contact member is provided with a similar apertured lug 96, both of which project into the hole 89 but in spaced relation longitudinally of said hole, and if found desirable, the means for making the connection may be a double plug, such as shown and described with relation to Figs. 6 and 7 and on which the same reference numerals are used.

The construction of the receptacle as herein illustrated and described provides for the insertion of a single straight plug member to complete both sides of the electrical circuit and therefore greatly facilitates the connection of a plug or plugs to the receptacle since it is much easier to locate a single hole than it is to locate two separate openings for the insertion of companion blades or terminals, especially in dimly lighted places.

Of course I do not wish to be limited to the exact details of construction herein shown and described as these may be varied within the limits of the appended claims without departing from the spirit of my invention.

Having thus fully described my invention, what I claim as new and useful is:—

1. An electrical receptacle comprising a casing having a number of holes therein and further provided with a pair of openings adjacent each hole parallel therewith and on opposite sides thereof, one of said openings communicating with the contiguous hole adjacent one end of the latter and the other opening contiguous said hole communicating with the latter adjacent the opposite end thereof, an outer contact member mounted in the casing and including spring arms located in one set of openings, said arms having their ends fashioned to provide noses for projection into the holes, an inner contact member also mounted in the body and including spring arms located in the other set of openings, said arms having portions bent back upon themselves to form extensions and the free ends of said extensions fashioned to provide noses for projection into the holes, both noses projecting into one hole being in spaced relation longitudinally, and means to provide separate connection for each contact member with one side of a source of electricity.

2. In an electrical receptacle, a casing including a body having a number of spaced parallel holes and also provided with a pair of openings for each hole, the openings of each pair being located on opposite sides of their respective hole and communicating with opposite ends of such hole through passageways, said body further having recesses in one face, each recess being in communication with the openings on the same side of all of the holes, a metal strap fitted in each of the recesses, a lug projecting from the outer edge thereof, spring contact arms projecting from the inner edge of one of said straps and located in the openings at one side of the holes, noses on the free ends of said arms and projecting from the openings into the holes through the passageways farthest removed from the recesses, other spring contact arms projecting from the inner edge of the other of said straps and located in the openings on the opposite side of the holes, extensions formed with said last named arms and projecting rearwardly, noses on the free ends of said extensions and projecting from the openings into the holes through the passageways adjacent the recesses, a plate covering the recessed face of the body to hold the metal straps and component parts within the body, and an apertured face plate on the opposite face of said body.

JAMES C. CLINTON.